United States Patent
Blaber et al.

(10) Patent No.: US 9,824,709 B2
(45) Date of Patent: Nov. 21, 2017

(54) NEAR FIELD TRANSDUCERS (NFTS) INCLUDING BARRIER LAYER AND METHODS OF FORMING

(71) Applicant: SEAGATE TECHNOLOGY LLC, Cupertino, CA (US)

(72) Inventors: Martin Blaber, Plymouth, MN (US);
Jie Gong, Eden Prairie, MN (US);
Dimitar Dimitrov, Edina, MN (US);
Steve Riemer, Minneapolis, MN (US);
Michael Kautzky, Eagan, MN (US);
Tong Zhao, Eden Prairie, MN (US);
Yongjun Zhao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/166,785

(22) Filed: May 27, 2016

(65) Prior Publication Data
US 2016/0351221 A1    Dec. 1, 2016

Related U.S. Application Data

(60) Provisional application No. 62/167,320, filed on May 28, 2015, provisional application No. 62/167,322, filed on May 28, 2015.

(51) Int. Cl.
*G11B 5/09* (2006.01)
*G11B 5/60* (2006.01)
(Continued)

(52) U.S. Cl.
CPC ............ *G11B 5/6088* (2013.01); *G11B 5/314* (2013.01); *G11B 5/3163* (2013.01); *G11B 2005/0021* (2013.01)

(58) Field of Classification Search
None
See application file for complete search history.

(56) References Cited

U.S. PATENT DOCUMENTS

| 4,492,873 A | 1/1985 | Dmitriv |
| 5,482,611 A | 1/1996 | Helmer |

(Continued)

FOREIGN PATENT DOCUMENTS

| EP | 240088 | 10/1987 |
| EP | 0942072 | 9/1999 |

(Continued)

OTHER PUBLICATIONS

Al-Bayati et al., Junction Profiles of Sub keV Ion Implantation for Deep Sub-Quarter Micron Devices, IEEE, 2000, pp. 87-90.

(Continued)

*Primary Examiner* — Peter Vincent Agustin
(74) *Attorney, Agent, or Firm* — Mueting, Raasch & Gebhardt, P.A.

(57) ABSTRACT

Devices having an air bearing surfaces (ABS), the devices including a near field transducer (NFT) that includes a disc having a front edge; a peg, the peg having a front surface at the air bearing surface of the apparatus, an opposing back surface, a top surface that extends from the front surface to the back surface, two side surfaces that expend from the front surface to the back surface and a bottom surface that extends from the front surface to the back surface; and a barrier layer, the barrier layer separating at least the back surface of the peg from the disc and the barrier layer having a thickness from 10 nm to 50 nm.

18 Claims, 7 Drawing Sheets

(51) Int. Cl.
   *G11B 5/31*   (2006.01)
   *G11B 5/00*   (2006.01)

(56) References Cited

U.S. PATENT DOCUMENTS

| | | | |
|---|---|---|---|
| 5,849,093 A | 12/1998 | Andra | |
| 5,945,681 A | 8/1999 | Tokiguchi | |
| 6,130,436 A | 10/2000 | Renau | |
| 6,589,676 B1 | 7/2003 | Gui | |
| 6,632,483 B1 | 10/2003 | Callegari | |
| 6,641,932 B1 | 11/2003 | Xu | |
| 6,683,426 B1 | 1/2004 | Kleeven | |
| 6,839,191 B2 | 1/2005 | Sugiura | |
| 7,377,228 B2 | 5/2008 | Mack | |
| 7,476,855 B2 | 1/2009 | Huang | |
| 8,077,559 B1 | 12/2011 | Miyauchi | |
| 8,325,567 B2 | 12/2012 | Miyauchi | |
| 8,351,151 B2 | 1/2013 | Katine | |
| 8,351,307 B1 | 1/2013 | Wolf | |
| 8,958,271 B1* | 2/2015 | Peng | G11B 5/314 369/13.13 |
| 2005/0012052 A1 | 1/2005 | Platzgummer | |
| 2006/0238133 A1 | 10/2006 | Horsky | |
| 2008/0230724 A1 | 9/2008 | Low | |
| 2010/0061199 A1 | 3/2010 | Hirara | |
| 2010/0123965 A1* | 5/2010 | Lee | G11B 5/314 360/59 |
| 2010/0123967 A1 | 5/2010 | Batra | |
| 2010/0190036 A1 | 7/2010 | Komvopoulos | |
| 2010/0214685 A1 | 8/2010 | Seigler | |
| 2010/0320403 A1 | 12/2010 | Amaldi | |
| 2011/0002199 A1 | 1/2011 | Takayama | |
| 2011/0006214 A1 | 1/2011 | Bonig | |
| 2011/0026161 A1 | 2/2011 | Ikeda | |
| 2011/0205863 A1 | 8/2011 | Zhao | |
| 2011/0209165 A1* | 8/2011 | Tsai | G11B 7/252 720/718 |
| 2011/0294398 A1 | 12/2011 | Hu | |
| 2011/0317528 A1 | 12/2011 | Miyauchi | |
| 2012/0045662 A1 | 2/2012 | Zou | |
| 2013/0107679 A1* | 5/2013 | Huang | G11B 13/08 369/13.32 |
| 2013/0148485 A1* | 6/2013 | Jin | G11B 5/314 369/13.17 |
| 2013/0161505 A1 | 6/2013 | Pitcher | |
| 2013/0164453 A1 | 6/2013 | Pitcher | |
| 2013/0164454 A1 | 6/2013 | Pitcher | |
| 2013/0170332 A1 | 7/2013 | Gao | |
| 2013/0279315 A1* | 10/2013 | Zhao | G11B 13/04 369/13.33 |
| 2013/0330573 A1 | 12/2013 | Zhao | |
| 2014/0050058 A1 | 2/2014 | Zou | |
| 2014/0113160 A1 | 4/2014 | Pitcher | |
| 2014/0204723 A1 | 7/2014 | Shimazawa | |
| 2014/0254335 A1* | 9/2014 | Gage | G11B 5/6088 369/13.33 |
| 2014/0269237 A1 | 9/2014 | Sasaki | |
| 2014/0307534 A1* | 10/2014 | Zhou | G11B 13/08 369/13.33 |
| 2014/0376342 A1 | 12/2014 | Wessel | |
| 2014/0376345 A1* | 12/2014 | Seets | G11B 5/3163 369/13.33 |
| 2014/0376349 A1* | 12/2014 | Cheng | G11B 5/6088 369/13.33 |
| 2015/0043319 A1* | 2/2015 | Kasuya | H01L 27/15 369/13.33 |
| 2015/0131417 A1 | 5/2015 | Zhao | |
| 2015/0170675 A1 | 6/2015 | Shimazawa | |
| 2015/0179194 A1* | 6/2015 | Cheng | G11B 5/3106 369/13.33 |
| 2015/0206545 A1 | 7/2015 | Balamane | |
| 2016/0133291 A1* | 5/2016 | Chen | G11B 5/314 369/13.33 |
| 2016/0351221 A1* | 12/2016 | Blaber | G11B 5/6082 |

FOREIGN PATENT DOCUMENTS

| | | |
|---|---|---|
| EP | 1328027 | 7/2003 |
| EP | 2106678 | 10/2008 |
| WO | WO 97/45834 | 12/1997 |

OTHER PUBLICATIONS

Angel et al., "Enhanced Low Energy Drift-Mode Beam Currents in a High Current Ion Implanter," IEEE, 1999, pp. 219-222.

Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.

Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.

Piazza et al., "Large Area Deposition of Hydrogenated Amorphous Carbon Films for Optical Storage Disks", Diamond and Related Materials, vol. 13, No. 4-8, Apr. 2004, pp. 1505-1510.

Robertson, J., "Diamond-Like Amorphous Carbon," Materials Science and Engineering R 37, 2002, pp. 129-281.

PCT/2013/030659 Search Report and Written Opinion dated Jun. 17, 2013.

PCT/US2013/024273 Search Report and Written Opinion dated Apr. 2, 2013.

PCT/US2013/024274 Search Report and Written Opinion dated Apr. 2, 2013.

PCT International Search Report and Written Opinion for PCT/US2016/034709 dated Aug. 24, 2016 (12 pages).

PCT International Search Report and Written Opinion for PCT/US2016/034615 dated Aug. 24, 2016 (13 pages).

\* cited by examiner

US 9,824,709 B2

NEAR FIELD TRANSDUCERS (NFTS) INCLUDING BARRIER LAYER AND METHODS OF FORMING

PRIORITY

This application claims priority to U.S. Provisional Applications No. 62/167,320 entitled, NEAR FIELD TRANSDUCERS (NFTS) AND ASSOCIATED STRUCTURES, filed on May 28, 2015; and No. 62/167,322 entitled NEAR FIELD TRANSDCUERS (NFTS) AND ASSOCIATED STRUCTURES AND METHODS OF FORMING, filed on May 28, 2015 the disclosures of which are incorporated herein by reference thereto.

SUMMARY

Disclosed herein are devices having an air bearing surfaces (ABS), the devices including a near field transducer (NFT) that includes a disc having a front edge; a peg, the peg having a front surface at the air bearing surface of the apparatus, an opposing back surface, a top surface that extends from the front surface to the back surface, two side surfaces that expend from the front surface to the back surface and a bottom surface that extends from the front surface to the back surface; and a barrier layer, the barrier layer separating at least the back surface of the peg from the disc and the barrier layer having a thickness from 10 nm to 50 nm.

Also disclosed are devices having an air bearing surfaces (ABS), the devices including a near field transducer (NFT) that includes a disc having a front edge; a peg, the peg having a front surface at the air bearing surface of the apparatus, an opposing back surface, a top surface that extends from the front surface to the back surface, two side surfaces that expend from the front surface to the back surface and a bottom surface that extends from the front surface to the back surface; and a barrier layer, the barrier layer separating at least the back surface, the side surfaces and the top surface of the peg from the disc and the barrier layer extending along the top surface and side surfaces of the peg to the air bearing surface.

Also disclosed are methods of forming a device the method including the steps of forming a peg, the peg including a plasmonic material; forming a photomask structure configured to form a disc/heatsink in contact with the peg, wherein the photomask structure forms an enclosure around at least a portion of the peg; adding an electroplating solution to the enclosure; and applying a current to the peg, wherein application of a current forms a barrier layer on the exposed portion of the peg within the enclosure.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to data storage devices that utilize heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic media during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head. The NFT may also be referred to as a plasmonic transducer, plasmonic antenna, near-field antenna, nano-disc, nano-patch, nano-rod, etc.

Generally, the NFT is formed by depositing a thin-film of material such as gold, silver, copper, etc., near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. Over time, this can affect the integrity and/or reliability of the NFT, for example, causing it to become misshapen or recess. Other events, such as contact between the read/write head and recording medium, contamination, etc., may also degrade the operation of the NFT and nearby optical components. Degradation of the NFT will affect the effective service life of a HAMR read/write head. In view of this, methods and apparatuses described herein are used to increase the thermal robustness of the NFT, such as at a peg that extends towards the recording media.

Figure 1:
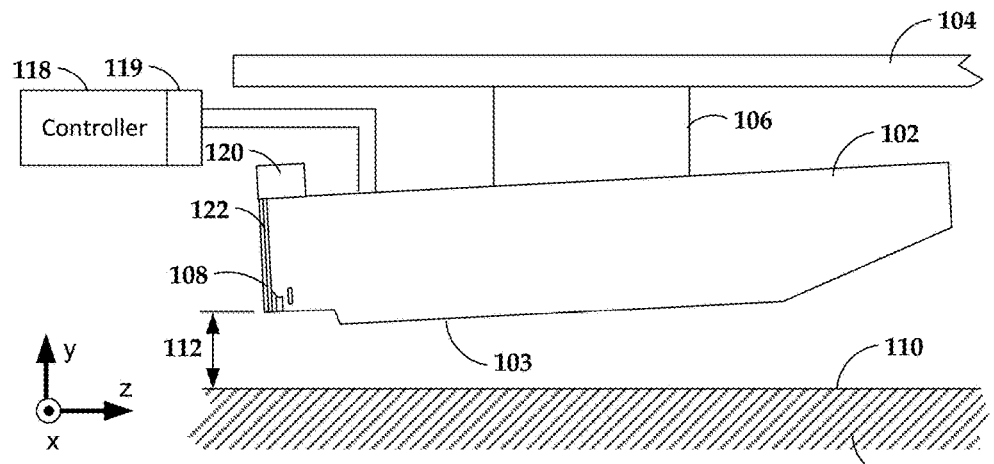
FIG. 1 is a block diagram of a hard drive slider and media arrangement according to an illustrative embodiment.

In reference now to FIG. 1, a block diagram shows a side view of a read/write head 102 according to an example embodiment. The read/write head 102 may be used in a magnetic data storage device, e.g., HAMR hard disc drive. The read/write head 102 may also be referred as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disc. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

A controller 118 is coupled to the read/write transducers 108, as well as other components of the read/write head 102, such as heaters, sensors, etc. The controller 118 may be part of general- or special-purpose logic circuitry that controls the functions of a storage device that includes at least the read/write head 102 and recording medium 111. The controller 118 may include or be coupled to interface circuitry 119 such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
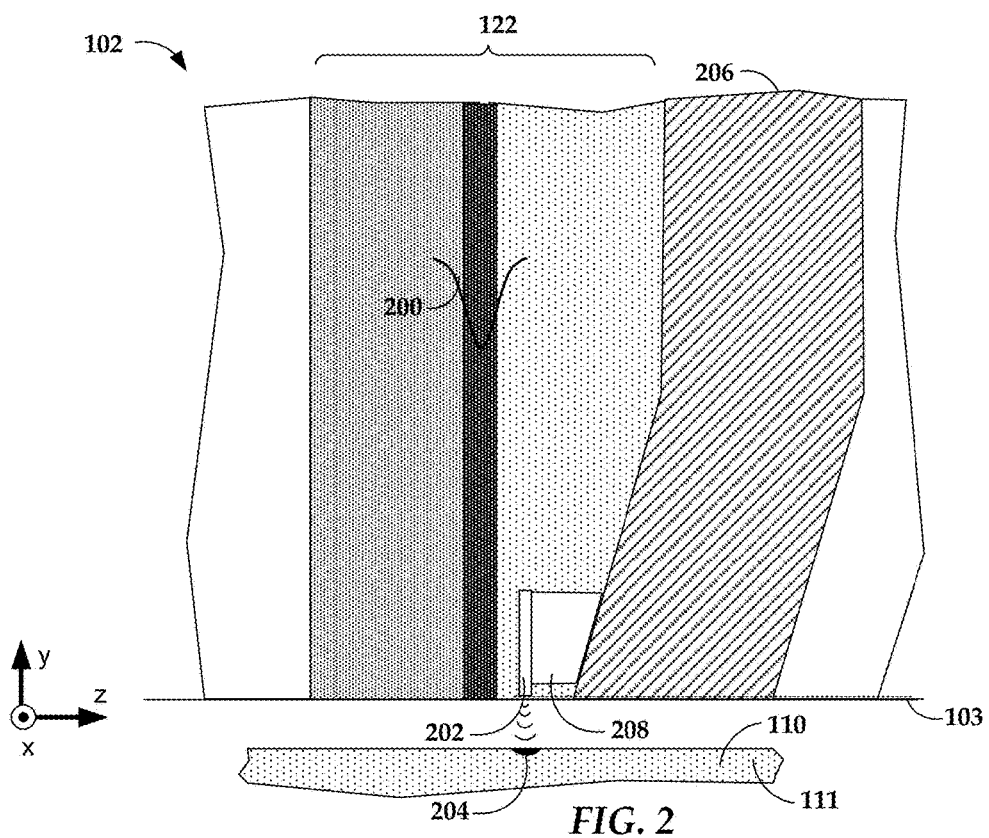
FIG. 2 is a cross-sectional view of a read/write head according to an illustrative embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be significant, leading to degradation of the near-field transducer 202 and other components over time. As such, techniques described herein facilitate increasing thermal robustness of the near-field transducer.

Figure 3:
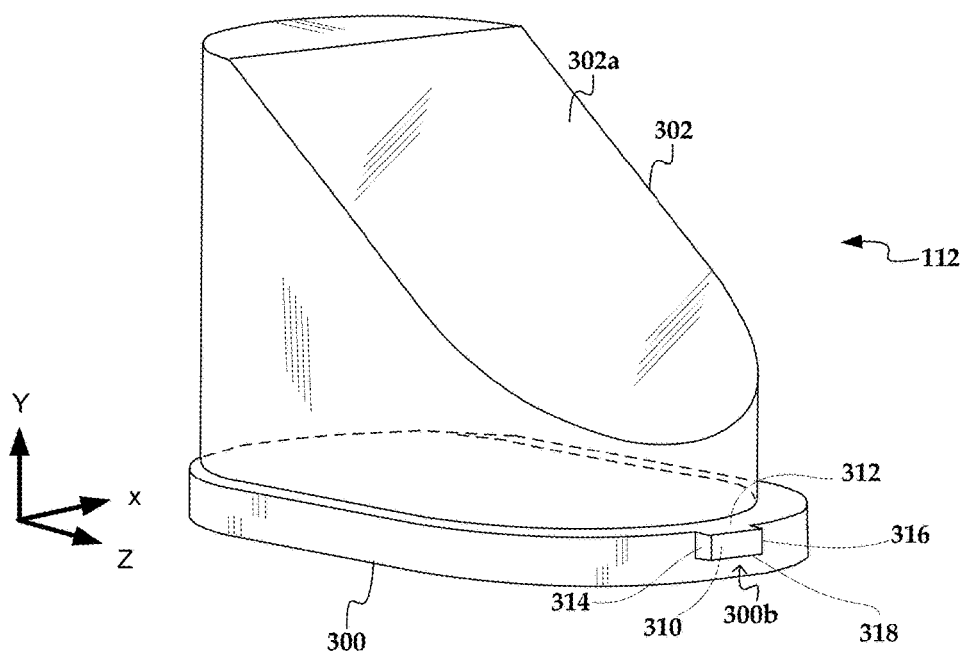
FIG. 3 is a perspective view of a near field transducer according to an illustrative embodiment.

In FIG. 3, a perspective views show details of a device 112 including a NFT. The device 112 can include two parts: a disc 300 and a heat sink 302 proximate to (e.g., deposited directly on to) the disc 300. In this example, the outline of the disc 300 on the xz-plane (which is a substrate-parallel plane) is enlarged relative to the heat sink 302, although they may be the same size. The heat sink 302 can include an angled surface 302a that is located proximate to a write pole (see, e.g., write pole 206 in FIG. 2).

The disc 300 acts as a collector of optical energy from a waveguide and/or focusing element. The disc 300 achieves surface plasmon resonance in response to the optical energy and the surface plasmons are directed to the medium via a peg 300b that extends from the disc 300. It should be noted that the heat sink may also contribute to the energy transfer process and in some such embodiments a NFT does not necessarily include a separate disc and heat sink but a single component that can act as both. In this example, the disc 300 is configured as an elongated plate with rounded (e.g., circular) ends, also referred to as a stadium or capsule shape. Other enlarged portion geometries may be used, including circular, rectangular, triangular, etc.

Figure 4:
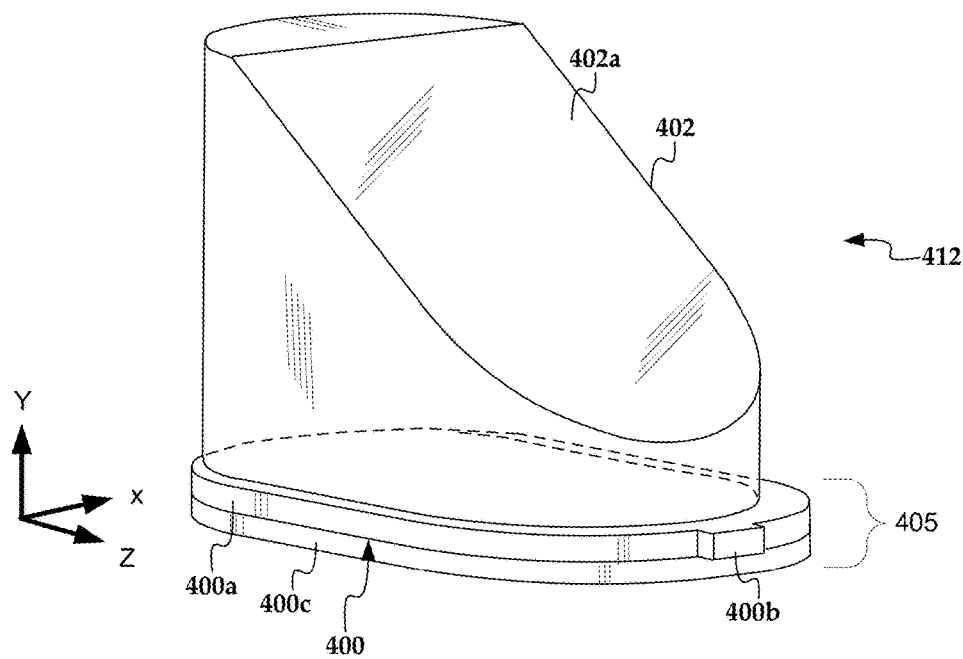
FIG. 4 is a perspective view of a near field transducer according to an illustrative embodiment.

In FIG. 4, a perspective views show details of a device 412 according to an example embodiment. The device 412 includes a NFT 405 and a heat sink 402 proximate to (e.g., deposited directly on to) the disc 400 of the NFT 405. In this example, the outline of the disc 400 on the xz-plane (which is a substrate-parallel plane) is enlarged relative to the heat sink 402, although they may be the same size. The heat sink 402 includes an angled surface 402a that is located proximate to a write pole (see, e.g., write pole 206 in FIG. 2).

The disc 400 includes a top disc 400a that acts as a collector of optical energy from a waveguide and/or focusing element. The top disc 400a achieves surface plasmon resonance in response to the optical energy and the surface plasmons are directed to the medium via a peg 400b that extends from top portion 400a. In this example, the top portion 400a is configured as an elongated plate with rounded (e.g., circular) ends, also referred to as a stadium or capsule shape. Other enlarged portion geometries may be used, including circular, rectangular, triangular, etc.

The disc 400 also includes a bottom disc 400c. The bottom disc 400c can also be referred to as a sunken disc. The term "sunken disc" refers to a base or bottom portion that extends below the peg, as shown by the base portion 400c in FIG. 3. This can also be described as the peg extending beyond the bottom disc 400c. In some embodiments, such as that depicted in FIG. 4, the bottom disc 400c and the top disc 400a can have the same outline shape (e.g., stadium shape) as well as a same outline size. In some embodiments, the bottom disc 400c and the top disc 400a can have different outline shapes, different outline sizes, or combinations thereof. The peg 400b extends beyond the bottom disc 400c. The bottom portion 400c is disposed proximate a light delivery structure (e.g., a waveguide core) and away from a write pole. In some embodiments, the bottom disc 400c may likely be, but need not be, the primary collector of optical energy.

Figure 5A:
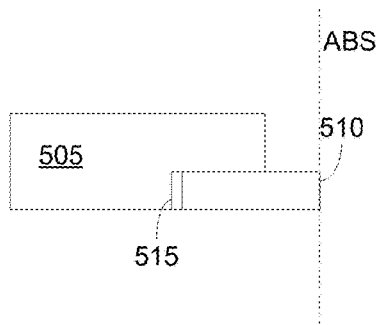
FIGS. 5A and 5B are cross sectional (FIG. 5A) and diagram (FIG. 5B) of a near field transducer that includes a disclosed barrier layer according to an illustrative embodiment.
Figure 5B:
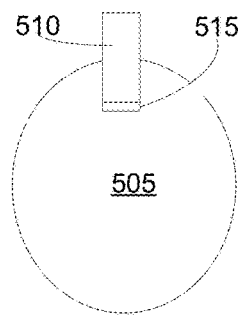

Disclosed NFTs include a barrier layer positioned at least between the back (the surface opposite the ABS) of the peg and the disc. In some embodiments this barrier layer can span the distance between the peg and the disc, or be located at the interface of the peg and the disc. An example of such an embodiment is depicted in FIGS. 5A (cross section view) and 5B (top down diagram). This illustrative embodiment includes a peg 510, a disc 505 and a barrier layer 515. It should be noted that although the disc is illustrated as oval in nature, any shape or configuration can be utilized. It should also be noted that the disc can include more than one piece (it could for example be similar to FIG. 4).

The barrier layer 515, as well as other disclosed barrier layers may function, at least in part to minimize or even prevent the diffusion of the peg material away from the ABS, the diffusion of the peg material into the disc, the diffusion of the peg material around the barrier layer, or combinations thereof. This may at least in part ultimately contribute to prevent or minimize recession of the peg away from the ABS during operation of the device. The barrier layer 515, as well as other disclosed barrier layers may also or alternatively function, at least in part to minimize or even prevent the diffusion of other materials, e.g., contaminants, into the peg. As a barrier layer becomes thicker or is present in more areas, it will inflict more optical penalties on the system. However, as a barrier layer becomes thicker, it will also be more effective as a barrier to movement. Therefore, these two affects must be weighed against each other to determine the thickness or overall volume of the barrier layer. As seen from the embodiment depicted in FIG. 5A, barrier layer 515 is located adjacent both the disc 505 and the peg 510 or stated another way is located between the disc 505 and the peg 510.

The barrier layer, which is at the interface of the peg and the disc, can be located at different positions with respect to the front of the disc 605. The front of the disc in all of FIGS. 6A, 6B, 6C and 6D is indicated by the dashed line 613. FIGS. 6A, 6B, 6C and 6D illustrate potential locations for the interface or the barrier layer with respect to the front 613 of the disc. In all such embodiments, the barrier layer is adjacent to or in contact with both the peg and the disc, so that it joins the two.

Figure 6A:
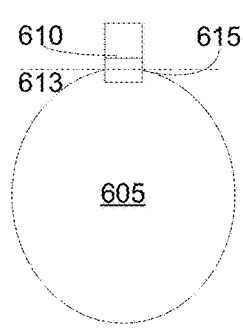
FIGS. 6A to 6D are diagrams of near field transducers that include disclosed barrier layers according to illustrative embodiments.

FIG. 6A illustrates an embodiment where the peg 610 does not overlap with the disc 605, or stated another way, the peg 610 is in front of (towards the ABS) the front of the disc 613. The barrier layer in this embodiment can also be described as spanning the distance between the peg and the disc and extending into the disc. A specific, illustrative embodiment of a structure where the barrier layer crosses the front of the disc is one in which the barrier layer extends 6 nm in front of (towards the peg) the front of the disc 613 to contact the peg 610 and 6 nm behind (towards the disc) the front of the disc 613 to contact the disc 605. In some embodiments, the distance in front of and behind the front of the disc need not be the same. In some embodiments, the distance in front of and behind the disc can independently be not less than 1 nm, not less than 2 nm or not less than 4 nm. In some embodiments, the distance in front of and behind the disc can independently be not greater than 15 nm, not greater than 10 nm, or not greater than 8 nm.

Figure 6B:
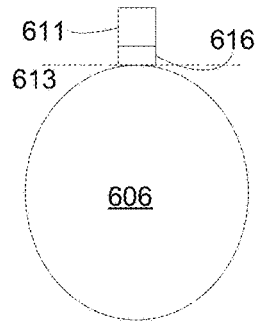

FIG. 6B illustrates an embodiment where the barrier layer 616 is located entirely in front of (towards the ABS or the peg) the front of the disc 613. The barrier layer in this embodiment can also be described as spanning the distance between the peg and the disc but not extending into the disc. A specific, illustrative embodiment of a structure where the barrier layer 616 is entirely in front of the front of the disc is one where the barrier layer extends 8 nm in front of the (towards the peg) the front of the disc 613 to contact the back of the peg 611. In some embodiments the barrier layer can be not less than 2 nm in front of the front of the disc, not less than 5 nm in front of the front of the disc, or not less than 7 nm in front of the front of the disc.

Figure 6C:
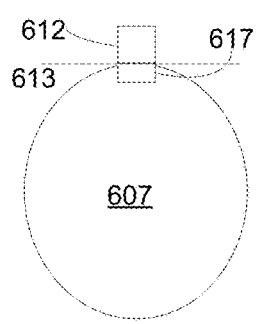

FIG. 6C illustrates an embodiment where the barrier layer 617 is located entirely behind (away from the ABS or the peg or towards the disc) the front of the front of the disc 613 and into the disc. A specific illustrative embodiment of a structure where the barrier layer 617 is entirely behind the front of the front of the disc and into the disc is one where the barrier layer extends 10 nm behind the (towards the disc) front of the disc 613 into and to contact the disc 607. In some embodiments the barrier layer can be not less than 2 nm behind the front of the disc and into the disc, not less than 5 nm behind the front of the disc and into the disc, or not less than 8 nm behind the front of the disc and into the disc. In some embodiments the barrier layer can be not greater than 20 nm behind the front of the disc and into the disc, not greater than 15 nm behind the front of the disc and into the disc, or not greater than 12 nm behind the front of the disc and into the disc.

Figure 6D:
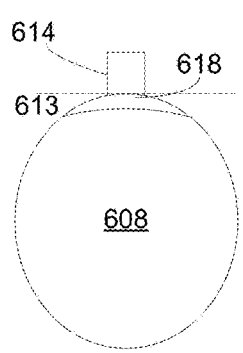

FIG. 6D illustrates another way of configuring an embodiment where the barrier layer 618 is entirely behind the front of the disc 613, e.g., is within the disc. The barrier layer 618 in the illustrated embodiment is wider than the peg, e.g., it extends beyond, on both sides, the footprint of the peg if the peg extended back into the disc. Barrier layers such as 618 that include material beyond the periphery of the peg may minimize or prevent the ability of the peg material to diffuse around the edges of the barrier layer.

Figure 7A:
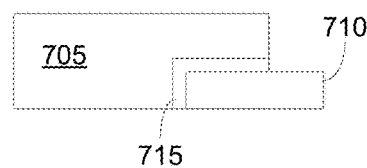
FIGS. 7A to 7D are cross sectional (FIG. 7A) and diagram (FIGS. 7B, 7C and 7D) of near field transducers that include disclosed barrier layers according to illustrative embodiments.
Figure 7B:
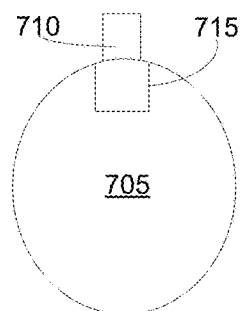

In some illustrative embodiments, a barrier layer can be located at additional positions, beyond only at the back of the peg adjacent the disc. FIGS. 7A and 7B illustrate one such embodiment, the NFT illustrated in FIG. 7A includes a disc 705, a peg 710 and a barrier layer 715. The barrier layer 715 is located at the back of the peg 710 and on at least a portion of the top of the peg 710. The barrier layer 715 in this embodiment does not extend outside the disc and is therefore not present at the ABS. FIG. 7B shows a top down view of the NFT showing the barrier layer 715 on top of the peg 710. A configuration such as that shown in FIGS. 7A and 7B may be advantageous because it is a fully self-aligned barrier layer (which can minimize diffusion, etc.) between the peg and the disc. This could contribute to enhanced interface quality, integrity of the barrier and a relatively small optical penalty. It should be noted that the barrier layer may but need not also be located under the peg 710, although it cannot be seen in this illustration. Such a barrier layer could also function as a seed layer depending on the process by which the structure is formed.

Figure 7C:
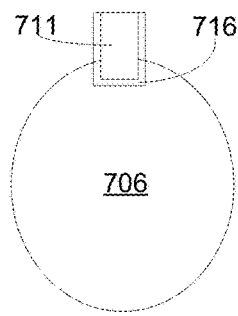

FIG. 7C shows another illustrative embodiment where the barrier layer 716 is located adjacent or around additional surfaces of the peg 711, even the surfaces that are outside the disc 706. As seen however, the barrier layer 716 is not located at the ABS. Such configurations may be advantageous because the formation process for such an embodiment may be relatively easier than others. However, the optical penalty of such a configuration may be larger than others. It should be noted that the barrier layer may but need not also be located under the peg 711, although it cannot be seen in this illustration. Such a barrier layer could also function as a seed layer depending on the process by which the structure is formed.

Figure 7D:
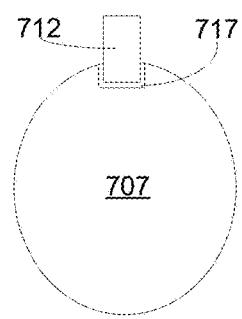

FIG. 7D shows another illustrative embodiment where the barrier layer 717 is located adjacent or around additional surfaces of the peg 712 but not the surfaces of the peg that are outside the disc 707. Such configurations may offer a relatively high barrier effectiveness and therefore may contribute to minimizing peg recession. However, processes for fabricating may be relatively more complex than others. It should be noted that the barrier layer may but need not also be located under the peg 711, although it cannot be seen in this illustration. Such a barrier layer could also function as a seed layer depending on the process by which the structure is formed.

Barrier layers such as those disclosed above can have thicknesses that need not be the same in the entire structure, e.g., the barrier layer can have a first thickness in one location and a second thickness in a second location (and so on). In some embodiments barrier layers can have a thickness that is not less than 10 nanometers (nm), not less than 15 nm, or not less than 20 nm. In some embodiments barrier layers can have a thickness that is not greater than 50 nm, not greater than 45 nm, not greater than 40 nm, or not greater than 35 nm.

In some embodiments, the material or materials of the barrier layer can depend, at least in part, on the material of the peg, the disc, or both. As such, In some embodiments, materials for the peg, the disc, or any combinations thereof can include aluminum (Al), antimony (Sb), bismuth (Bi), chromium (Cr), cobalt (Co), copper (Cu), erbium (Er), gadolinium (Gd), gallium (Ga), gold (Au), hafnium (Hf), indium (In), iridium (Ir), iron (Fe), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), tantalum (Ta), tin (Sn), titanium (Ti), vanadium (V), tungsten (W), ytterbium (Yb), yttrium (Y), zirconium (Zr), or combinations thereof. Illustrative examples of materials for the peg, the disc, the heat sink, or any combinations thereof can include binary and/or ternary alloys including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include lanthanides, actinides, or combinations thereof including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include dispersions including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include alloys or intermetallics based on or including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative alloys or intermetallics can include, for example binary and ternary silicides, nitrides, and carbides. For example vanadium silicide (VSi), niobium silicide (NbSi), tantalum silicide (TaSi), titanium silicide (TiSi), palladium silicide (PdSi) for example zirconium nitride (ZrN), aluminum nitride (AlN), tantalum nitride (TaN), hafnium nitride (HfN), titanium nitride (TiN), boron nitride (BN), niobium nitride (NbN), or combinations thereof. Illustrative carbides can include, for example silicon carbide (SiC), aluminum carbide (AlC), boron carbide (BC), zirconium carbide (ZrC), tungsten carbide (WC), titanium carbide (TiC) niobium carbide (NbC), or combinations thereof. Additionally doped oxides can also be utilized. Illustrative doped oxides can include aluminum oxide (AlO), silicon oxide (SiO), titanium oxide (TiO), tantalum oxide (TaO), yttrium oxide (YO), niobium oxide (NbO), cerium oxide (CeO), copper oxide (CuO), tin oxide (SnO), zirconium oxide (ZrO) or combinations thereof. Illustrative examples of materials for the peg, the disc, the heat sink, or any combinations thereof can include conducting oxides, conducting nitrides or combinations thereof of various stoichiometries where one part of the oxide, nitride or carbide includes Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include a metal including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr doped with oxide, carbide or nitride nanoparticles. Illustrative oxide nanoparticles can include, for example, oxides of yttrium (Y), lanthanum (La), barium (Ba), strontium (Sr), erbium (Er), zirconium (Zr), hafnium (Hf), germanium (Ge), silicon (Si), calcium (Ca), aluminum (Al), magnesium (Mg), titanium (Ti), cerium (Ce), tantalum (Ta), tungsten (W), thorium (Th), or combinations thereof. Illustrative nitride nanoparticles can include, for example, nitrides of zirconium (Zr), titanium (Ti), tantalum (Ta), aluminum (Al), boron (B), niobium (Nb), silicon (Si), indium (In), iron (Fe), copper (Cu), tungsten (W), or combinations thereof. Illustrative carbide nanoparticles can include, for example carbides of silicon (Si), aluminum (Al), boron (B), zirconium (Zr), tungsten (W), titanium (Ti), niobium (Nb), or combinations thereof. In some embodiments nanoparticles can include combinations of oxides, nitrides, or carbides. It is to be understood that lists of combinations of elements are not exclusive to monoatomic binary combinations, for example VSi is taken to include $V_2Si$ and $VSi_2$, for example. It should also be noted that the heat sink can also be made of any of the above listed materials in this paragraph. In some embodiments, the peg, the disc, the heat sink or any combination thereof can include gold (Au), rhodium (Rh), silver (Ag), iridium (Ir), copper (Cu), cobalt (Co), nickel (Ni), platinum (Pt), palladium (Pd), tantalum (Ta), alloys thereof, or combinations thereof.

In some embodiments, at least some portion of the barrier layer or more than one portion of the barrier layer can independently be selected from bismuth (Bi), arsenic (As), gallium (Ga), germanium (Ge), tellurium (Te), lead (Pb), antimony (Sb), indium (In), tin (Sn), cadmium (Cd), thallium (Tl) silver (Ag), palladium (Pd), platinum (Pt), rhodium (Rh), iridium (Ir), osmium (Os), ruthenium (Ru), technetium (Tc), rhenium (Re), mercury (Hg), chromium (Cr), manganese (Mn), iron (Fe), cobalt (Co), nickel (Ni), copper (Cu), zinc (Zn), tungsten (W), niobium (Nb), or combinations thereof. In some embodiments, at least some portion of the barrier layer or more than one portion of the barrier layer can independently be selected from an alloy. Illustrative, specific alloys can include, for example CoFe, NiFe, NiCu, CdTe, $Sn_2Te_3$, PbSe, $Bi_2Te_3$, NiP, NiWP, NiMoP, NiW, and NiMo. In some embodiments, at least some portion of the barrier layer or more than one portion of the barrier layer can independently be selected from semimetal oxides, sulfides or combinations thereof. Illustrative semi-metal oxides and sulfides can include, for example $Bi_2O_3$, ZnO, $TeO_2$, CuO, InO, $SnO_2$, SmZnO, CdS, ZnS, HgS, $Bi_2S_3$, SnS, $In_2S_3$ and PbS. In some embodiments, at least some portion of the barrier layer or more than one portion thereof can independently be selected from rhodium (Rh), ruthenium (Ru), iridium (Ir), tungsten (W), niobium (Nb), alloys thereof or compounds thereof. An example of a specific compound can include nickel phosphate (NiP), for example.

Figure 8:
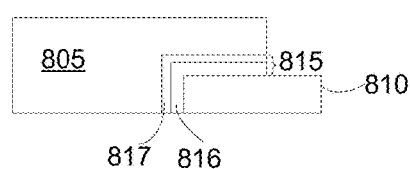
FIG. 8 is a cross sectional view of a near field transducer that includes a disclosed multilayer barrier layer according to an illustrative embodiment.

In some illustrative embodiments, a barrier layer, regardless of its location can include more than one layer. In some embodiments, a barrier layer, regardless of its location can include at least two layers, for example. FIG. 8A illustrates an example of such embodiments; the barrier layer 815 in this illustrated embodiment includes a first interface layer 816 adjacent the peg 810 and a second interface layer adjacent the disc 805.

In some embodiments, the first interface layer 816 provides conformal coverage over the back (opposite the ABS) surface of the peg 810. In some embodiments, the first interface layer can function as a diffusion barrier between the peg material and the disc material thereby providing some level of stabilization to the peg/disc interface. In some embodiments, the first interface layer 816 can have a thickness of not less than 2 nm, not less than 5 nm, or not less than 10 nm, for example. In some embodiments, the first interface layer 816 can have a thickness of not greater than 25 nm, not greater than 20 nm, or not greater than 15 nm, for example.

Illustrative materials that can be utilized for the first interface layer 816 can include, for example materials that are relatively stable upon thermal annealing, are not likely to interdiffuse into the peg material or the write pole material, does not form alloys with the peg material or write pole material at elevated temperatures, or combinations thereof. Illustrative materials that can be utilized for the first interface layer 816 can include, for example rhodium (Rh), ruthenium (Ru), iridium (Ir), tungsten (W), niobium (Nb), nickel phosphate (NiP), or combinations thereof. In some particular embodiments, illustrative materials that can be utilized for the first interface layer 816 can include, for example Rh.

In some embodiments, the second interface layer 817 may function to provide a source of material that can diffuse into the peg to backfill recessions of the peg that may occur during operation. The material that can backfill the peg could be the material of the second interface layer itself or an oxide or sub-oxide of the second interface layer material. In some embodiments, the second interface layer 817 can have a thickness of not less than 0.2 nm, not less than 0.5 nm, or not less than 1 nm, for example. In some embodiments, the second interface layer 817 can have a thickness of not greater than 10 nm, not greater than 8 nm, or not greater than 5 nm, for example.

Illustrative materials that can be utilized for the second interface layer 817 can include, for example iron (Fe), nickel (Ni), cobalt (Co), zinc (Zn), cadmium (Cd), manganese (Mn), chromium (Cr), tellurium (Te), antimony (Sb), alloys thereof, or compounds thereof. Illustrative alloys can include ternary and quaternary materials including such elements. Specific illustrative alloys can include, for example nickel phosphate (NiP), nickel boron (NiB), nickel tungsten phosphate (NiWP) and cobalt iron boron (CoFeB). In some embodiments, the second interface layer 817 can include alloys including iron (Fe). In some embodiments, the second interface layer 817 can include iron containing alloys with nickel (Ni), cobalt (Co), or combinations thereof.

In some embodiments, various specific embodiments of the barrier layer can function even after 400° C. annealing for 3 hours to prevent observable diffusion.

Also disclosed herein are methods of forming disclosed barrier layers and NFTs including disclosed barrier layers.

One type of an illustrative method for forming disclosed barrier layers includes forming the barrier layer using plating, for example electroplating. The use of electroplating can be advantageous because the layer so formed is conformal, especially on the back surface of the peg, because the material can be deposited only where the barrier layer is desired, thereby not requiring additional process steps to remove the excess material from undesired locations, or combinations thereof. Plating of the barrier layer can be accomplished by using the peg itself as one of the electrodes for the plating process. In some embodiments, the barrier layer can be plated after rod formation (e.g., after rod mill) to cover the entire rod. In some embodiments, the barrier layer can be plated prior to deposition of the disc, thereby forming a barrier layer around between the back surface of the peg and the disc, between a portion of the top surface of the peg and the disc, and on the exterior surfaces of the entire disc and/or heat sink structure.

Another type of an illustrative method for forming disclosed barrier layers includes forming a peg (or a rod for example) that includes the material for the barrier layer and processing the peg so that the barrier layer material is forced out of the peg material thereby forming the barrier layer. The material that will eventually become the barrier layer can be referred to as the segregant material. Various ways of doing this can be envisioned. In one such embodiment, a multi-layer structure that alternates (for example) between peg material and the segregant material can be formed. This multilayer structure could also be referred to as a laminate structure. In another such embodiment, the peg material can be doped or implanted with the segregant material. In another such embodiment, the peg material can be alloyed with the segregant material.

Figure 9A:
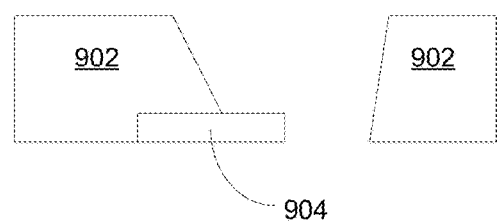
FIGS. 9A to 9C illustrate structures at various different stages of disclosed methods and FIGS. 9D, 9E and 9F illustrate possible structures.
Figure 9B:
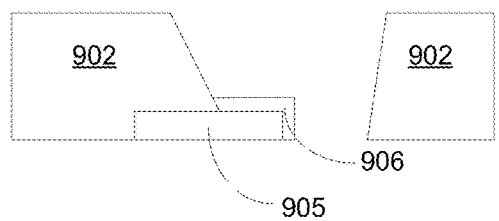
Figure 9C:
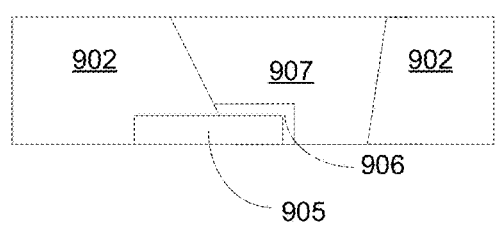
Figure 9D:
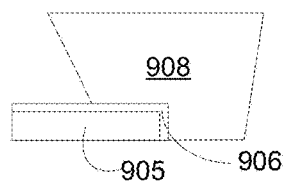

FIG. 9A to 9D illustrate structures at various different stages of disclosed methods. As seen in FIG. 9A, after the peg material and segregant material peg 904 is formed (using one of the methods above, for example), a photomask 902 for the disc can be formed on or over at least part of the peg. A subsequent step in such methods includes a step that is designed to drive the segregant material from the peg material. Possible methods of accomplishing this step can include, for example heating (e.g., annealing), application of an electrical current, application of a chemical agent, or some combination thereof. FIG. 9B shows the structure after this step has been accomplished with the peg 905, the barrier layer 906 and the photomask 902. After this step, the peg 905 includes less of the segregant material, in some embodiments substantially less, and in some embodiments includes substantially no segregant material and the barrier layer 906 is made only substantially of segregant material. A subsequent step includes deposition of material to ultimately form the disc in the areas not covered by the photomask 902. FIG. 9C shows the structure after completion of this step, with the deposited material 907 inside the photomask 902. It should be noted that there may be a step carried out before the structure in FIG. 9C is seen of removing additional deposited disc material that exists on the photomask 902 and optionally in other areas. A subsequent step then includes removal of the photomask 902 so that the peg 905, the barrier layer 906 and the disc 908 remain.

Figure 9E:
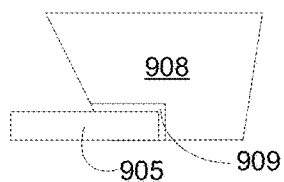
Figure 9F:
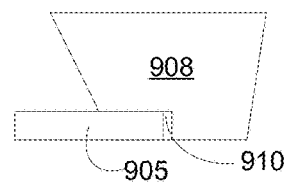

It should be noted that the barrier layer 906 depicted in FIGS. 9A to 9D is only one illustrative example of a configuration of a barrier layer that could be produced using such methods. For example, a barrier layer could be formed that is only present outside the photomask 902. Such a barrier layer can be seen in the structure depicted in FIG. 9E, for example. Another example includes a barrier layer that is only formed at the back surface of the peg 905. Such a barrier layer 910 can be seen in the structure depicted in FIG. 9F, for example. Such structures could be produced using various methods, including for example deposition (e.g., vacuum deposition, chemical deposition, etc.) or plating methods (e.g., electroplating). In some embodiments, plating methods may offer the advantage of producing barrier layers of higher quality, less optical penalties, or combinations thereof.

In some illustrative embodiments of disclosed methods the structure formed in FIG. 9A can also be utilized to form a barrier layer using electroplating. In such an embodiment, the structure indicated as the peg segregant material 904 would only include peg material. The peg material would be connected to a source of electricity, and the void inside the photomask 902 configured for formation of the disc could then be filled with electroplating solution containing materials to form a desired barrier layer. Application of a current to the peg would then form a barrier layer on the surfaces of the peg exposed in the void of the mask.

Also disclosed herein are methods and processes of making disclosed structures. FIGS. 10A to 10I illustrate perspective views of a specific embodiment of a process flow capable of making such a device and FIGS. 10J and 10K show other views of the structure so produced.

A first illustrative step in a disclosed process flow includes forming a peg mold 1005 on a substrate 1010. Although not depicted in FIGS. 10A to 10I, the substrate 1010 could include other structures, may be part of a larger structure or device, or both. In some embodiments, the peg mold 1005 may be made of amorphous carbon (aC). The peg mold 1005 can have straight sidewalls and have desirable dimensions related to the final desired dimensions of a peg. Any commonly utilized methods can be utilized to form, pattern, or otherwise the peg mold.

Figure 10A:
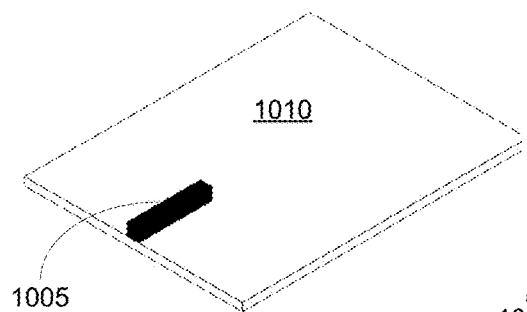
FIGS. 10A to 10H depict structures during a disclosed illustrative process flow and FIGS. 10I, 10J and 10K show various views of resultant structures.
Figure 10B:
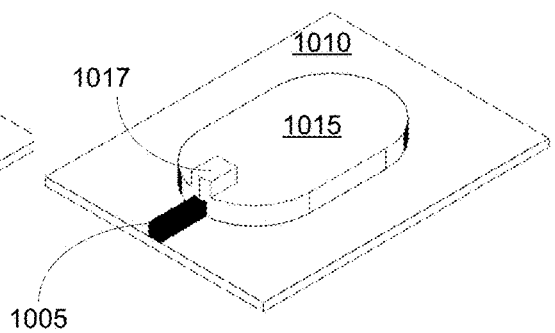

After formation of the peg mold 1005, FIG. 10B shows the structure after the next step, deposition of the disc material 1015. The disc material 1015 can be deposited using various methods (including for example sputtering, plating, vapor deposition, etc.) and patterned using photolithography with liftoff process (including for example using masking, exposure, removal, etc. techniques). It should be noted that the disc material 1015 includes a raised portion 1017 due to the presence of the underlying peg mold.

Figure 10C:
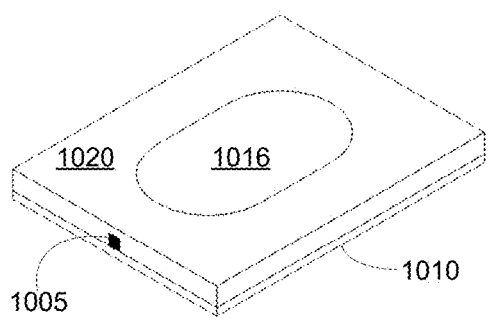

After deposition of the disc material, FIG. 10C shows the structure after completion of the next few steps, deposition of an oxide material and removal of at least some portion of the oxide material and at least some portion of the disc material. In some embodiments, the oxide material can include any oxide that has dielectric properties, for example $Al_2O_3$, $SiO_2$, SiN, SiON, etc. The oxide material is first deposited over the entire structure (not depicted in process flow) to a thickness that at least covers the entire disc material 1015. After deposition of the oxide material, a removal technique such as chemical mechanical polishing (CMP) can be utilized to remove at least some of the deposited oxide material and at least some of the raised portion 1017 of the disc material 1015. In some embodiments, CMP is utilized and the process is configured to stop on the surface of the disc material 1015 (below the level of the raised portion 1017). FIG. 10C shows the structure after the removal step has been completed and shows the pre-disc 1016 surrounded by the oxide layer 1020 located on the substrate 1010. It should also be noted that the peg mold 1005 is also covered by the oxide layer 1020 after completion of these steps.

Figure 10D:
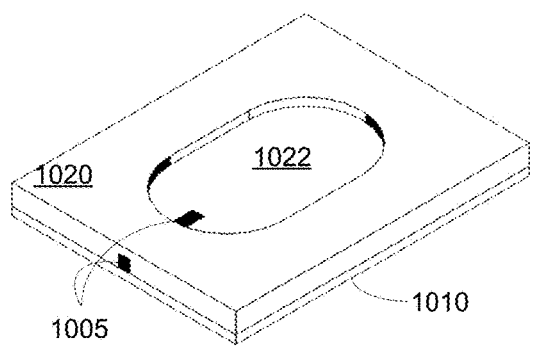

FIG. 10D shows the structure after completion of the next step. This step utilizes an angled mill to remove some of the material of the pre-disc 1016 (in FIG. 10C) to both expose the peg mold 1005 under the disc material and move the edge of the oxide lower towards the ABS to make a couple nanometer overlay. This can be accomplished, for example, by using an angled mill to make the opening in the oxide layer larger than the bottom disc. Alternatively, this can also be accomplished using a wet etch. For example, after milling the oxide layer open to the disc material 1015 and peg mold 1005, a slow wet etch, for example using developer, can be utilized to etch the oxide layer sufficiently to make the opening in the oxide layer about 5 nm bigger than the disc. This is the step that allows the barrier to protrude a beyond the edge of the disc so that the final peg is separated from the disc by this barrier layer. After completion of this step, the structure includes disc material 1022 with the peg mold 1005 exposed therein.

Figure 10E:
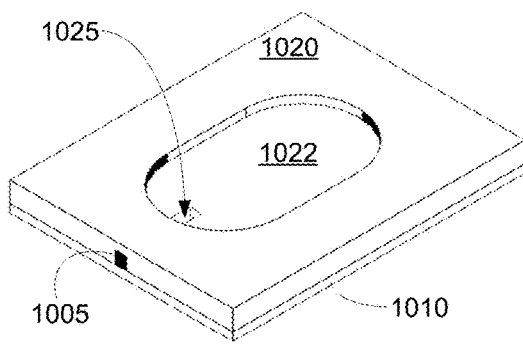
Figure 10F:
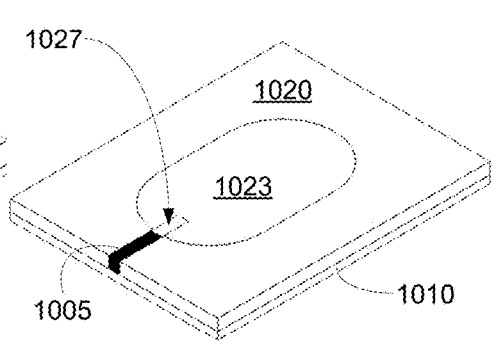

FIG. 10E shows the structure after the next step. The next step includes removing the exposed peg mold 1005 within the disc material 1022 to form a void 1025. The peg mold 1005, which can be made of, for example, amorphous carbon can be removed by ashing for example. FIG. 10F shows the structure after the next steps, deposition of the barrier material 1027 in the void 1025 (of FIG. 10E) and a removal technique (e.g., CMP) to expose the front remaining peg mold 1005. The removal technique can also serve to remove any addition barrier material that was over-deposited. It should be noted that the purpose accomplished in the discussion surrounding FIG. 10D could alternatively be accomplished at this step during the exposed peg mold etch using $O_2$ plasma ashing for example. At this step, over ashing can be purposely done so that there will be an undercut beyond the edge of the disc. The barrier materials will then be filled in beyond the edge of the disc.

Figure 10G:
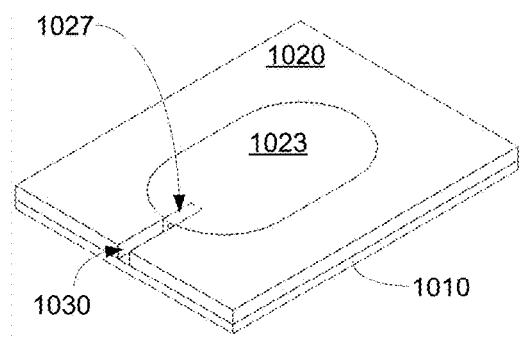
Figure 10H:
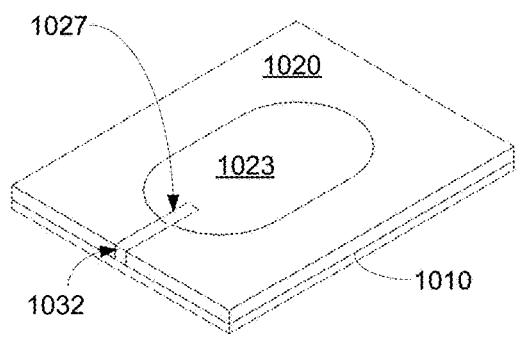

FIG. 10G shows the structure after completion of the next step, removal of the remaining peg mold 1005 (in FIG. 10F) to form a second void 1030. The remaining peg mold 1005, which can be made of, for example, amorphous carbon can be removed by ashing for example. FIG. 10H shows the structure after completion of the next steps, deposition of peg material (which can also be referred to as filling the peg) in the second void 1030 (in FIG. 10G) and removal of excess peg material by, for example CMP.

Figure 10I:
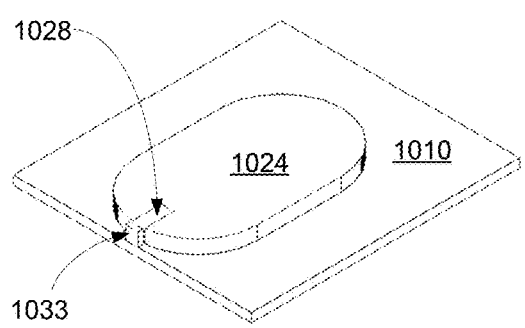
Figure 10J:
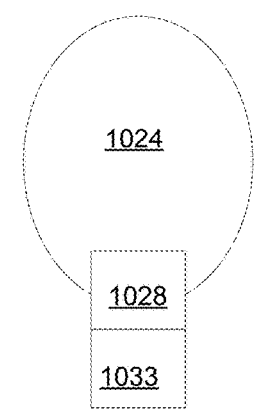
Figure 10K:
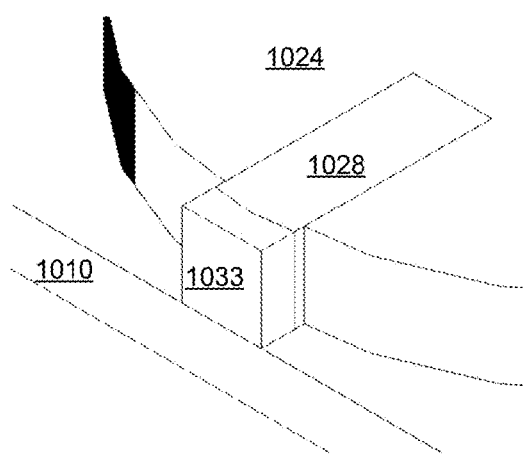

FIGS. 10I, 10J and 10K show various views of the final structure. It should be noted that the oxide layer 1020 is shown as having been removed, but was only done for the sake of viewing the underlying structure. As seen in the figures, the final structure includes a disc 1024, a barrier layer 1028 and a peg 1033. The barrier layer 1028 separates the peg 1033 from the disc 1024.

It should be noted that the process flow depicted in FIGS. 10A to 10H can be combined with other processes or methods including those described herein and those described elsewhere.

FIGS. 11A to 11D illustrate optional steps that could take the place of the steps depicted in FIGS. 10F to 10H. Stated another way, the steps depicted in FIGS. 11A to 11D could be combined with and follow the steps depicted in FIGS. 10A to 10E.

Figure 11A:
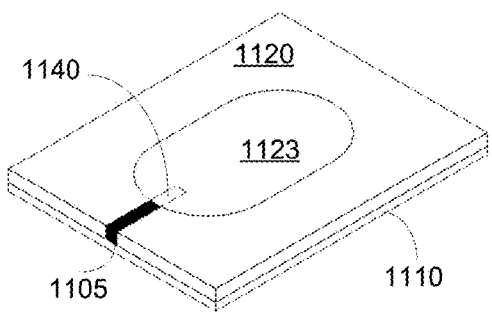
FIGS. 11A to 11D depict structures during a disclosed illustrative process flow and FIGS. 11E and 11F show various views of resultant structures.

The structure in FIG. 11A includes a substrate 1110, an oxide layer 1120, disc material 1123, a remaining peg mold 1105. FIG. 11A shows the structure after deposition of disc material (which can also be referred to as filler), which would have been deposited in the void (void 1025 of FIG. 10E) and use of a removal technique (e.g., CMP) to expose the front remaining peg mold 1105. The removal technique can also serve to remove any additional disc material that was over-deposited. This step then forms an additional portion of the disc 1140. For the sake of comparison, in the process depicted in FIGS. 10A to 10H, the barrier material 1027 was deposited in the void 1025.

Figure 11B:
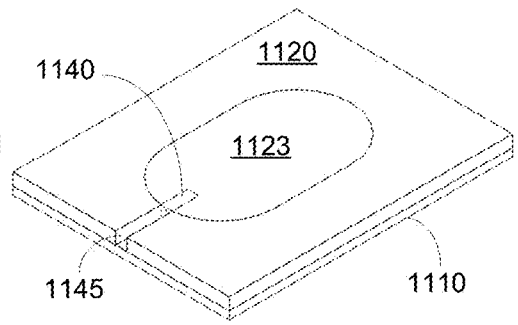

FIG. 11B shows the structure after completion of the next step, removal of the remaining peg mold 1105 (in FIG. 11A) to form a peg void 1145. The remaining peg mold 1105, which can be made of, for example, amorphous carbon can be removed by ashing for example.

Figure 11C:
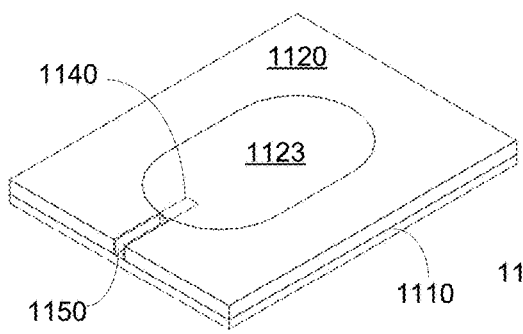

FIG. 11C shows the structure after completion of the next step, deposition of a barrier layer 1150. This step can be accomplished using a conformal method of deposition. This step can also optionally include etching some of the deposited material away. For example a vertical etch could be undertaken which in this circumstance could leave a relatively thin layer of material remaining on the sidewalls of the trench. In some embodiments, the vertical milling can include argon milling.

Figure 11D:
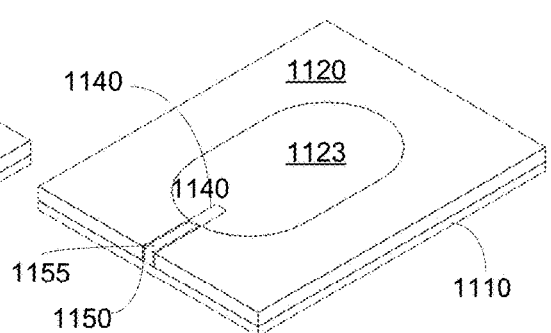
Figure 11E:
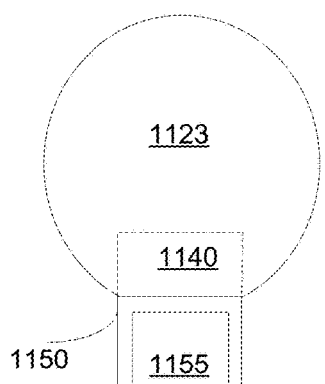
Figure 11F:
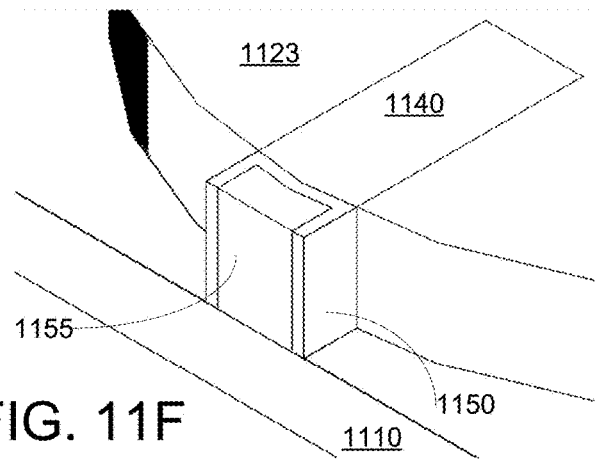

FIG. 11D shows the structure after completion of the next step, deposition of additional peg 1155 material over the barrier layer 1150 and removal of excess additional peg material by, for example CMP. The oxide layer is removed from the structure for the sake of visualizing the underlying structure which can be seen in FIGS. 11E and 11F. The structure includes a disc which is made up of disc 1123 and filled disc portion 1140, a peg 1155 and a barrier layer 1150 that separates the peg 1155 from the disc 1123/1140.

It should be noted that the process flow depicted in FIGS. 11A to 11D can be combined with other processes or methods including those described herein and those described elsewhere.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of near field transducers (NFTs) including barrier layers and methods of forming are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device having an air bearing surface (ABS), the device comprising:
    a near field transducer (NFT) comprising:
        a disc having a front edge;
        a peg, the peg having a front surface at the air bearing surface of the apparatus, an opposing back surface, a top surface that extends from the front surface to the back surface, two side surfaces that extend from the front surface to the back surface and a bottom surface that extends from the front surface to the back surface; and
        a barrier layer, the barrier layer separating at least the back surface of the peg from the disc and the barrier layer having a thickness from 15 nm to 50 nm,
        wherein the peg is in front of the front edge of the disc and the barrier layer extends from 1 nm to 15 nm in front of and behind the front edge of the disc.

2. The device according to claim 1, wherein the barrier layer is entirely in front of the front edge of the disc and the surface of the barrier layer that contacts the back surface of the peg is greater than 2 nm away from the front edge of the disc.

3. The device according to claim 1, wherein the barrier layer is entirely behind the front edge of the disc and the barrier layer extends from 2 nm to 20 nm behind the front edge of the disc.

4. The device according to claim 1, wherein the barrier layer comprises bismuth (Bi), arsenic (As), gallium (Ga), germanium (Ge), tellurium (Te), lead (Pb), antimony (Sb), indium (In), tin (Sn), cadmium (Cd), thallium (Tl) silver (Ag), palladium (Pd), platinum (Pt), osmium (Os), technetium (Tc), rhenium (Re), mercury (Hg), chromium (Cr), manganese (Mn), iron (Fe), nickel (Ni), copper (Cu), zinc (Zn), niobium (Nb), or combinations thereof.

5. The device according to claim 4, wherein the barrier layer comprises rhodium (Rh), ruthenium (Ru), iridium (Ir), tungsten (W), niobium (Nb), or combinations thereof.

6. The device according to claim 1, wherein the barrier layer also separates the side surfaces and the top surface of the peg from the disc and the barrier layer extends along the top surface and side surfaces of the peg to the air bearing surface.

7. The device according to claim 6, wherein the barrier layer comprises bismuth (Bi), arsenic (As), gallium (Ga), germanium (Ge), tellurium (Te), lead (Pb), antimony (Sb), indium (In), tin (Sn), cadmium (Cd), thallium (Tl) silver (Ag), palladium (Pd), platinum (Pt), rhodium (Rh), iridium (Ir), osmium (Os), ruthenium (Ru), technetium (Tc), rhenium (Re), mercury (Hg), chromium (Cr), manganese (Mn), iron (Fe), cobalt (Co), nickel (Ni), copper (Cu), zinc (Zn), tungsten (W), niobium (Nb), or combinations thereof.

8. The device according to claim 7, wherein the barrier layer comprises rhodium (Rh), ruthenium (Ru), iridium (Ir), tungsten (W), niobium (Nb), or combinations thereof.

9. The device according to claim 6, wherein the barrier layer has a thickness from 10 nm to 50 nm.

10. The device according to claim 6, wherein the barrier layer comprises a first interface layer adjacent the peg and a second interface layer adjacent the disc.

11. The device according to claim 10, wherein the first interface layer comprises rhodium (Rh), ruthenium (Ru), iridium (Ir), tungsten (W), niobium (Nb), nickel phosphate (NiP), or combinations thereof; and the second interface layer comprises iron (Fe), nickel (Ni), cobalt (Co), zinc (Zn), cadmium (Cd), manganese (Mn), chromium (Cr), tellurium (Te), antimony (Sb), alloys thereof, or compounds thereof.

12. A device having an air bearing surface (ABS), the device comprising:
a near field transducer (NFT) comprising:
a disc having a front edge;
a peg, the peg having a front surface at the air bearing surface of the apparatus, an opposing back surface, a top surface that extends from the front surface to the back surface, two side surfaces that extend from the front surface to the back surface and a bottom surface that extends from the front surface to the back surface; and
a barrier layer, the barrier layer separating at least the back surface of the peg from the disc and the barrier layer having a thickness from 15 nm to 50 nm,
wherein the peg is behind the front edge of the disc and the barrier layer further comprises a portion that separates at least the top and the side surfaces of the peg within the disc from the disc.

13. The device according to claim 12, wherein the barrier layer further comprises a portion that is outside the disc.

14. A device having an air bearing surface (ABS), the device comprising:
a near field transducer (NFT) comprising:
a disc having a front edge;
a peg, the peg having a front surface at the air bearing surface of the apparatus, an opposing back surface, a top surface that extends from the front surface to the back surface, two side surfaces that extend from the front surface to the back surface and a bottom surface that extends from the front surface to the back surface; and
a barrier layer, the barrier layer separating at least the back surface of the peg from the disc and the barrier layer having a thickness from 15 nm to 50 nm and comprising a first interface layer adjacent the peg and a second interface layer adjacent the disc.

15. The device according to claim 14, wherein the first interface layer comprises rhodium (Rh), ruthenium (Ru), iridium (Ir), tungsten (W), niobium (Nb), nickel phosphate (NiP), or combinations thereof; and the second interface layer comprises iron (Fe), nickel (Ni), cobalt (Co), zinc (Zn), cadmium (Cd), manganese (Mn), chromium (Cr), tellurium (Te), antimony (Sb), alloys thereof, or compounds thereof.

16. A method of forming a device comprising the steps of:
forming a peg, the peg comprising a plasmonic material;
forming a photomask structure configured to form a disc/heatsink in contact with the peg, wherein the photomask structure forms an enclosure around at least a portion of the peg;
adding an electroplating solution to the enclosure; and
applying a current to the peg, wherein application of a current forms a barrier layer on the exposed portion of the peg within the enclosure.

17. The method of claim 16 further comprising removing the remaining electroplating solution after the barrier layer has been formed and forming a disc/heatsink on the barrier layer using the photomask structure.

18. The method of claim 17 further comprising removing the photomask structure.

* * * * *